(12) United States Patent
Tomiyama

(10) Patent No.: US 10,250,844 B2
(45) Date of Patent: *Apr. 2, 2019

(54) SIGNAL PROCESSING DEVICE AND METHOD

(71) Applicant: SONY SEMICONDUCTOR SOLUTIONS CORPORATION, Kanagawa (JP)

(72) Inventor: Hitoshi Tomiyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,059

(22) Filed: May 26, 2017

(65) Prior Publication Data

US 2017/0264857 A1 Sep. 14, 2017

Related U.S. Application Data

(63) Continuation of application No. 14/738,462, filed on Jun. 12, 2015, now Pat. No. 9,729,814, which is a
(Continued)

(30) Foreign Application Priority Data

Jul. 18, 2012 (JP) .................................. 2012-159439

(51) Int. Cl.
*H04N 5/232* (2006.01)
*H04N 5/77* (2006.01)
(Continued)

(52) U.S. Cl.
CPC ......... *H04N 5/772* (2013.01); *H04N 5/23203* (2013.01); *H04N 5/23206* (2013.01);
(Continued)

(58) Field of Classification Search
CPC .......... G08B 13/19689; G08B 13/1963; H04N 5/23203; H04N 5/23206; H04N 5/9201; H04N 1/00114
(Continued)

(56) References Cited

U.S. PATENT DOCUMENTS 5,561,474 A 10/1996 Kojima et al.
5,587,746 A * 12/1996 Nakakuki ................ H04N 9/64
348/500

(Continued)

OTHER PUBLICATIONS

Non-Final Rejection for U.S. Appl. No. 14/738,462, dated Aug. 26, 2016, 05 pages.
(Continued)

*Primary Examiner* — Ngoc Yen T Vu
(74) *Attorney, Agent, or Firm* — Chip Law Group

(57) ABSTRACT

There is provided a signal processing device including a signal generation unit that generates a control signal for controlling an imaging device connected via one cable, a signal superimposition unit that superimposes the control signal generated by the signal generation unit on a video signal received from the imaging device via the cable without an influence on display of a video corresponding to the video signal, and a transmission unit that transmits the signals superimposed by the signal superimposition unit to the imaging device via the cable.

9 Claims, 8 Drawing Sheets

Related U.S. Application Data continuation of application No. 13/910,560, filed on Jun. 5, 2013, now Pat. No. 9,083,927.

(51) Int. Cl.

| | | |
|---|---|---|
| *H04N 9/67* | (2006.01) | |
| *H04N 9/77* | (2006.01) | |
| *H04N 9/64* | (2006.01) | |
| *H04N 5/235* | (2006.01) | |
| *H04N 5/92* | (2006.01) | |
| *H04N 1/00* | (2006.01) | |
| *H04N 5/76* | (2006.01) | |
| *H04N 5/765* | (2006.01) | |
| *G08B 13/196* | (2006.01) | |

(52) U.S. Cl.
CPC ........... *H04N 5/23296* (2013.01); *H04N 9/64* (2013.01); *H04N 9/67* (2013.01); *H04N 9/77* (2013.01); *G08B 13/19689* (2013.01); *H04N 1/00114* (2013.01); *H04N 5/76* (2013.01); *H04N 5/765* (2013.01); *H04N 5/9201* (2013.01)

(58) Field of Classification Search
USPC .......................................... 348/211.9, 211.14
See application file for complete search history.

(56) References Cited

U.S. PATENT DOCUMENTS

| | | | | |
|---|---|---|---|---|
| 7,697,064 B2* | 4/2010 | Komatsu | ............... | H04N 5/4401 |
| | | | | 348/453 |
| 7,804,523 B2* | 9/2010 | Ikeda | ................. | H04N 5/23203 |
| | | | | 348/211.8 |
| 8,031,231 B2 | 10/2011 | Suga et al. | | |
| 2006/0066725 A1* | 3/2006 | Dodrill | ................. | H04N 5/232 |
| | | | | 348/207.99 |
| 2016/0269670 A1* | 9/2016 | Kim | ........................ | H04N 7/01 |

OTHER PUBLICATIONS

Notice of Allowance and Fees Due (PTOL-85) for U.S. Appl. No. 14/738,462, dated Mar. 21, 2017, 08 pages.

* cited by examiner

SIGNAL PROCESSING DEVICE AND METHOD

CROSS REFERENCE TO RELATED APPLICATION

The present application is a continuation application of U.S. patent application Ser. No. 14/738,462, filed Jun. 12, 2015, which is a continuation application of U.S. patent application Ser. No. 13/910,560, filed Jun. 5, 2013, and claims the priority from prior Japanese Priority Patent Application JP 2012-159439 filed in the Japan Patent Office on Jul. 18, 2012. Each of the above-referenced applications is hereby incorporated herein by reference in its entirety.

BACKGROUND

The present technology relates to a signal processing device and method, and more particularly, to a signal processing device and method capable of adding a PTZ (pan, tilt, and zoom) function of a camera without addition of new cost.

In the past, monitoring camera systems capable of performing PTZ control have been configured using a dedicated cable (for example, an RS-485 cable) different from a coaxial cable that transmits a video in order to perform the PTZ control of a monitoring camera (see a "small-sized dome-type PTZ color camera with 41-million pixels," [online], APA DIRECT, [accessed Jul. 6, 2012], Internet <http://www.apa-direct.com/camera/camera_dome/ap-8777z.html>).

SUMMARY

However, cost necessary to install a dedicated cable different from a coaxial cable that transmits a video in a building is high compared to a camera. Accordingly, when a monitoring camera system is configured by an existing coaxial cable, it is necessary to install a new dedicated cable in order to newly perform PTZ control, and thus the cost may increase.

It is desirable to provide a technology capable of adding a PTZ function of a camera without addition of new cost.

According to an embodiment of the present disclosure, there is provided a signal processing device including a signal generation unit that generates a control signal for controlling an imaging device connected via one cable, a signal superimposition unit that superimposes the control signal generated by the signal generation unit on a video signal received from the imaging device via the cable without an influence on display of a video corresponding to the video signal, and a transmission unit that transmits the signals superimposed by the signal superimposition unit to the imaging device via the cable.

The signal generation unit may generate a control signal for controlling at least one of pan, tilt, and zoom of the imaging device.

The signal superimposition unit may superimpose the control signal in a horizontal synchronization signal section of the video signal.

The signal generation unit may generate the control signal at a frequency other than a reference frequency of a color difference signal. And the signal superimposition unit may superimpose the control signal generated by the signal generation unit on a color burst section of the video signal.

The signal generation unit may generate the control signal at a level lower than a noise level of the video signal. And the signal superimposition unit may superimpose the control signal generated by the signal generation unit on the entire video signal.

The signal processing device may further include a recording control unit that controls recording of the video signal.

The signal processing device may further include a display control unit that controls display of the video signal.

According to an embodiment of the present disclosure, there is provided a signal processing method performed by a signal processing device, the method including generating a control signal for controlling an imaging device connected via one cable, superimposing the generated control signal on a video signal received from the imaging device via the cable without an influence on display of a video corresponding to the video signal, and transmitting the superimposed signals to the imaging device via the cable.

According to the embodiment of the present technology, a control signal used to control an imaging device connected via one cable is generated. The control signal generated by the signal generation unit is superimposed on a video signal received from an imaging device via the cable without an influence on display of a video corresponding to the video signal. The superimposed signal is transmitted to the imaging device via the cable.

According to the embodiments of the present technology, it is possible to add the PTZ functions of a camera without addition of new cost.

DETAILED DESCRIPTION OF THE EMBODIMENTS

Figure 1:
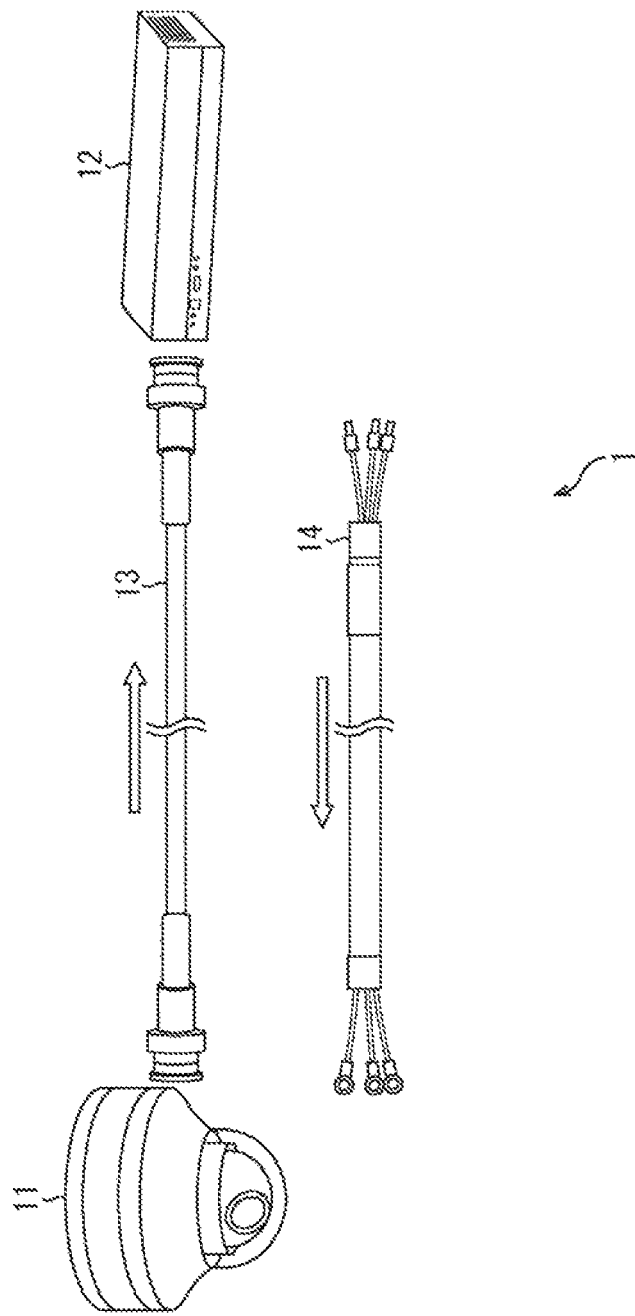
FIG. 1 is a diagram illustrating an example of the configuration of a monitoring camera system according to the related art.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, a mode (hereinafter referred to as an embodiment) for carrying out the present technology will be described.

[Configuration of Monitoring Camera System According to Related Art]

FIG. 1 is a diagram illustrating an example of the configuration of a monitoring camera system according to the related art.

A monitoring camera system 1 illustrated in FIG. 1 is configured to include an imaging device 11 and a recording reproduction device 12. In the example of FIG. 1, to facilitate the description, two arranged cables are illustrated and do not connect the imaging device 11 to the recording reproduction device 12. However, in practice, the two cables are each connected to each terminal of each device.

The imaging device 11 is a monitoring camera configured as an analog camera or the like that includes an imaging element such as a charge coupled device (CCD) image sensor or a complementary metal oxide semiconductor (CMOS) image sensor. The imaging device 11 includes a pan mechanism that moves a lens in a pan (vertical) direction, a tilt mechanism that moves the lens in a tilt (horizontal) direction, and a zoom mechanism that zooms the lens.

The recording reproduction device 12 is connected to the imaging device 11 via two cables, a coaxial cable 13 and a dedicated cable 14, and records or displays a video signal imaged by the imaging device 11 and received via the coaxial cable 13. The recording reproduction device 12 transmits control signals of the pan mechanism, the tilt mechanism, and the zoom mechanism of the imaging device 11 to the imaging device 11 via the dedicated cable 14 in response to a user's operation.

That is, a CVBS (Color Video, Blank, and Sync) signal which is an analog video signal imaged by the imaging device 11 is transmitted to the recording reproduction device 12 via the coaxial cable 13. A PTZ (pan, tilt, and zoom) signal used to perform PTZ control of the imaging device 11 is transmitted from the recording reproduction device 12 to the imaging device 11 via the dedicated cable 14 such as an RS-485 cable.

The imaging device 11 is installed on, for example, a ceiling or the like of a space desired to be monitored. The recording reproduction device 12 is installed in a space which is to be monitored and is different from the space in which the imaging device 11 is installed, for example, a place distant by 500 m to 1,000 m from the imaging device 11.

Accordingly, in order to install the monitoring camera system 1 in a building, the two cables, the coaxial cable 13 and the dedicated cable 14, should be installed between the imaging device 11 and the recording reproduction device 12 distant from each other by, for example, 500 m to 1,000 m. That is, when the monitoring camera system is configured by an existing coaxial cable, a new dedicated cable should be installed to newly perform the PTZ control, and thus cost may increase.

[Configuration of Monitoring Camera System According to Embodiment of the Present Technology]

Figure 2:
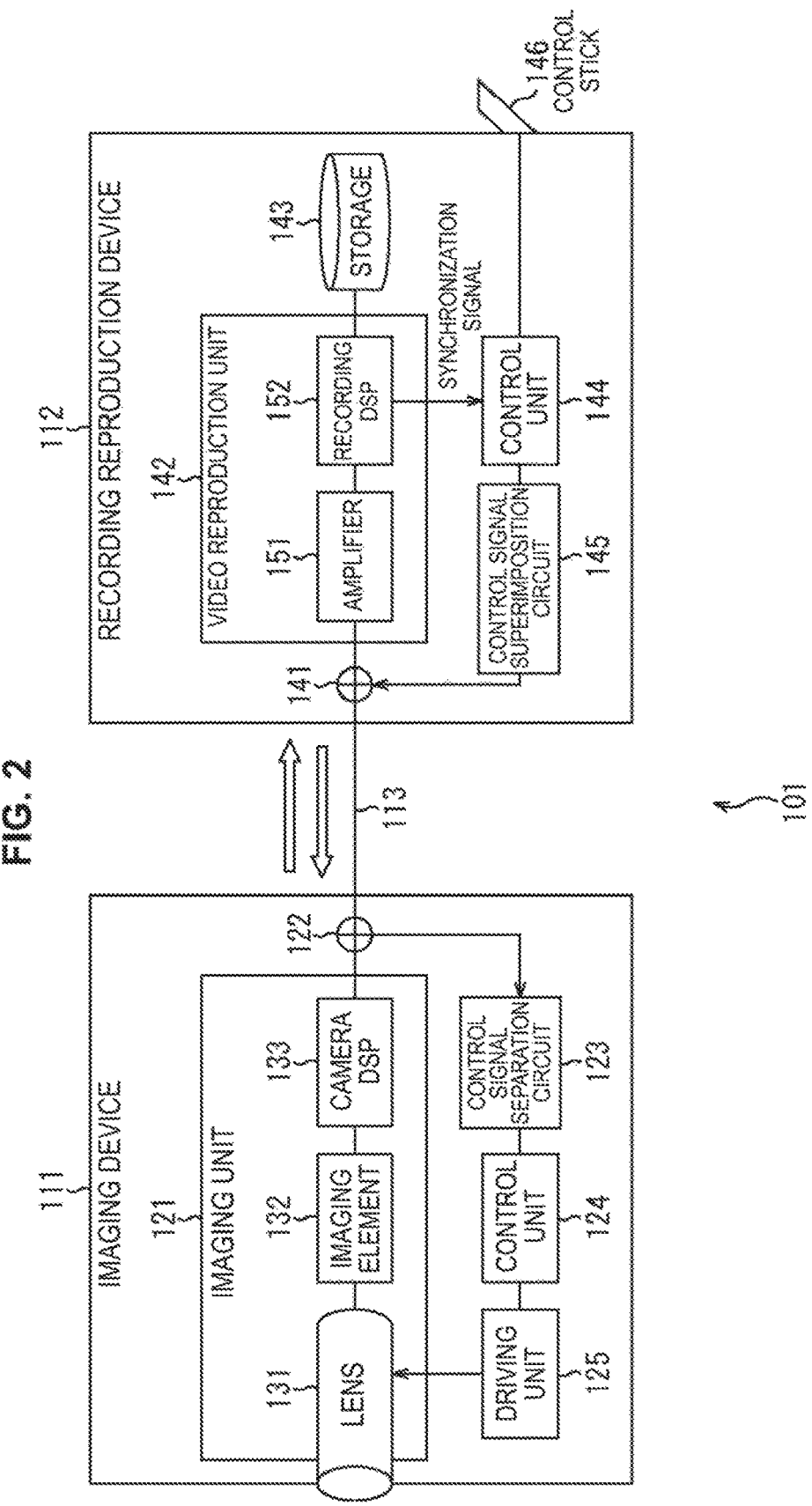
FIG. 2 is a block diagram illustrating an example of the configuration of a monitoring camera system according to an embodiment of the present technology.

FIG. 2 is a diagram illustrating an example of the configuration of the monitoring camera system according to an embodiment of the present technology.

A monitoring camera system 101 illustrated in FIG. 2 is configured to include an imaging device 111 and a recording reproduction device 112. The recording reproduction device 112 is a signal processing device according to the embodiment of the present technology.

The imaging device 111 is a monitoring camera that is configured as an analog camera or the like and is installed on, for example, a ceiling of a space which is desired to be monitored. The recording reproduction device 112 is connected to the imaging device 111 via a coaxial cable 113, and records or displays a video signal imaged by the imaging device 111 via the coaxial cable 113. The recording reproduction device 112 is installed in a space which is to be monitored and is different from the space in which the imaging device 111 is installed, for example, a place 500 m to 1,000 m from the imaging device 111.

The recording reproduction device 112 transmits a control signal (PTZ signal) used to control at least one of a pan mechanism, a tilt mechanism, and a zoom mechanism of the imaging device 111 to the imaging device 111 via the coaxial cable 113 in response to a user's operation.

In the example of FIG. 2, a CVBS signal which is an analog video signal imaged by the imaging device 111 is transmitted to the recording reproduction device 112 via the coaxial cable 113. On the other hand, the PTZ signal used to perform the PTZ control of the imaging device 111 is transmitted from the recording reproduction device 112 to the imaging device 111 via the coaxial cable 113.

That is, in the embodiment of the present technology, the PTZ signal is superimposed on the CVBS signal by adjusting a transmission timing, a transmission frequency, or a level of the PTZ signal. In other words, a digital signal is multiplexed in a band of an analog signal. Thus, the PTZ signal can be transmitted via the coaxial cable 113 through which the CVBS signal is transmitted.

In the example of FIG. 2, the imaging device 111 is configured to include an imaging unit 121, an arithmetic unit 122, a control signal separation circuit 123, a control unit 124, and a driving unit 125.

The imaging unit 121 is configured to include a lens 131, an imaging element 132 such as a CCD or a CMOS, and a camera digital signal processor (DSP) 133.

The pan mechanism, the tilt mechanism, and the zoom mechanism are installed in the lens 131. An image of light condensed via the lens 131 is formed in the imaging element 132 and is supplied as an analog video signal to the camera DSP 133. The camera DSP 133 performs predetermined signal processing on the analog video signal and outputs the analog video signal to the arithmetic unit 122.

The arithmetic unit 122 transmits the analog video signal from the camera DSP 133 to the recording reproduction device 112 via the coaxial cable 113. The arithmetic unit 122 supplies a signal received via the coaxial cable 113 to the control signal separation circuit 123.

The control signal separation circuit 123 separates the PTZ signal from the signal from the arithmetic unit 122 and supplies the separated PTZ signal to the control unit 124.

The control unit 124 controls pan, tilt, and zoom processes performed by the driving unit 125 based on the PTZ signal from the control signal separation circuit 123. The driving unit 125 includes a motor and operates the pan mechanism, the tilt mechanism, the zoom mechanism, and the like of the lens 131 under the control of the control unit 124.

The recording reproduction device 112 is configured to include an arithmetic unit 141, a video reproduction unit 142, a storage 143, a control unit 144, and a control signal superimposition circuit 145. In practice, a display control unit or the like is included, but this is not illustrated in the example of FIG. 2.

The arithmetic unit 141 receives a video signal from the imaging device 111 and supplies the video signal to the video reproduction unit 142. The arithmetic unit 141 superimposes a control signal from the control signal superimposition circuit 145 on the video signal and transmits the video signal to the imaging device 111.

The video reproduction unit 142 includes an amplifier 151 and a recording DSP 152. The amplifier 151 amplifies the video signal from the arithmetic unit 141 and supplies the amplified video signal to the recording DSP 152. The recording DSP 152 performs predetermined signal processing necessary for recording on the video signal amplified by the amplifier 151 and records the video signal on the storage 143. The recording DSP 152 detects a horizontal synchronization signal from the amplified video signal and supplies the detected horizontal synchronization signal to the control unit 144.

The control unit 144 determines a superimposition method of superimposing a control signal from a control stick 146 on the video signal based on the horizontal synchronization signal or the like detected by the recording DSP 152, and generates a control signal according to the superimposition method or adjusts the generated control signal. The control unit 144 controls the control signal superimposition circuit 145 such that the control signal superimposition circuit 145 superimposes the control signal on the video signal. The control signal superimposition circuit 145 supplies the arithmetic unit 141 with the control signal to be superimposed on the video signal according to the superimposition method determined by the control unit 144.

The control stick 146 inputs a control signal in response to a user's operation and supplies the control signal to the control unit 144.

[Superimposition Method According to Embodiment of the Present Technology]

Next, three superimposition methods of superimposing the PTZ signal according to the embodiment of the present technology will be described with reference to FIGS. 3 to 5. In the embodiment of the present technology, the PTZ signal is superimposed on a video signal and is transmitted by the coaxial cable 113 without an influence on display of a video corresponding to the video signal according to one of first to third superimposition methods to be described below.

Figure 3:
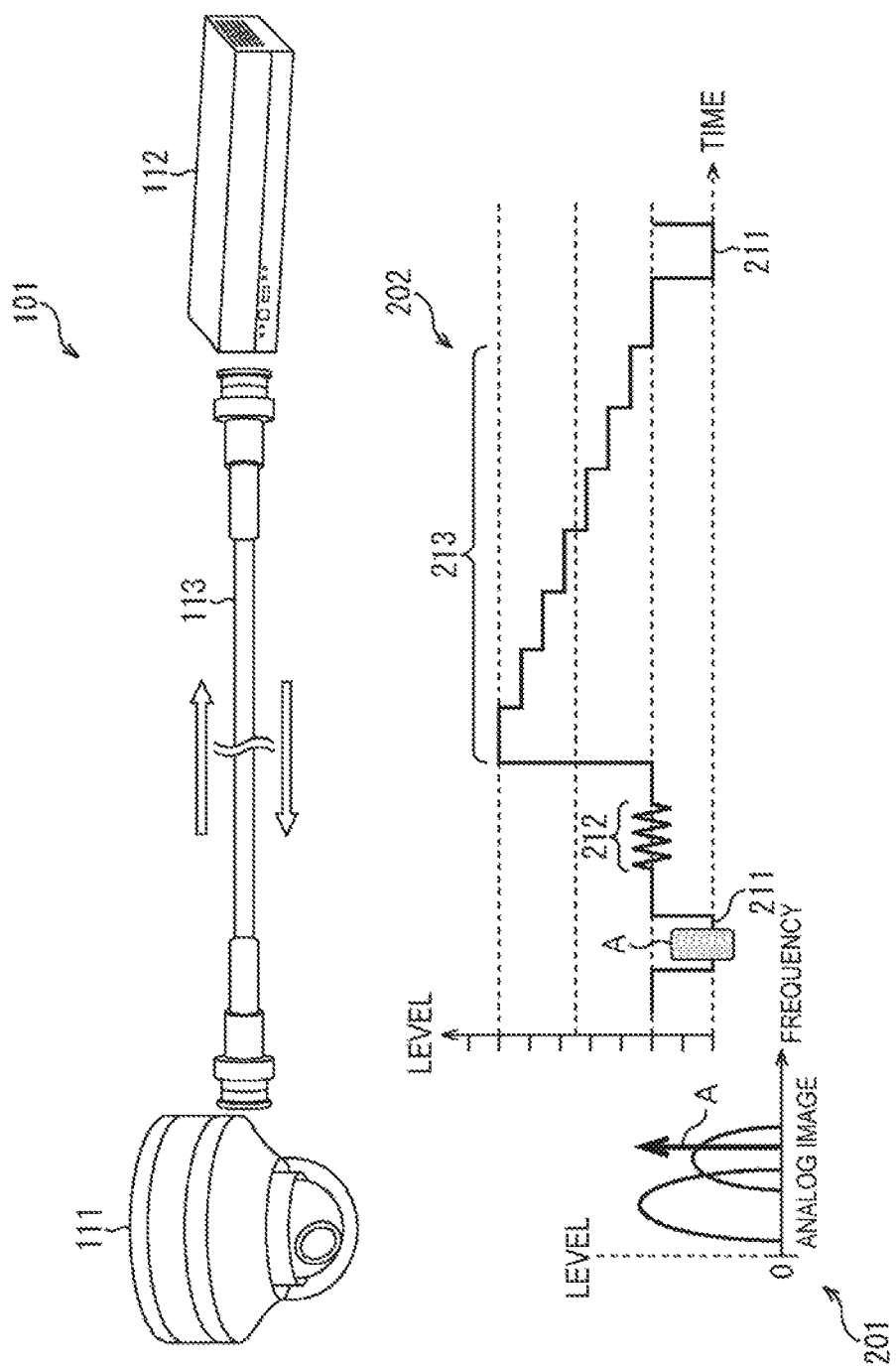
FIG. 3 is a diagram illustrating a first method of superimposing a control signal.
Figure 4:
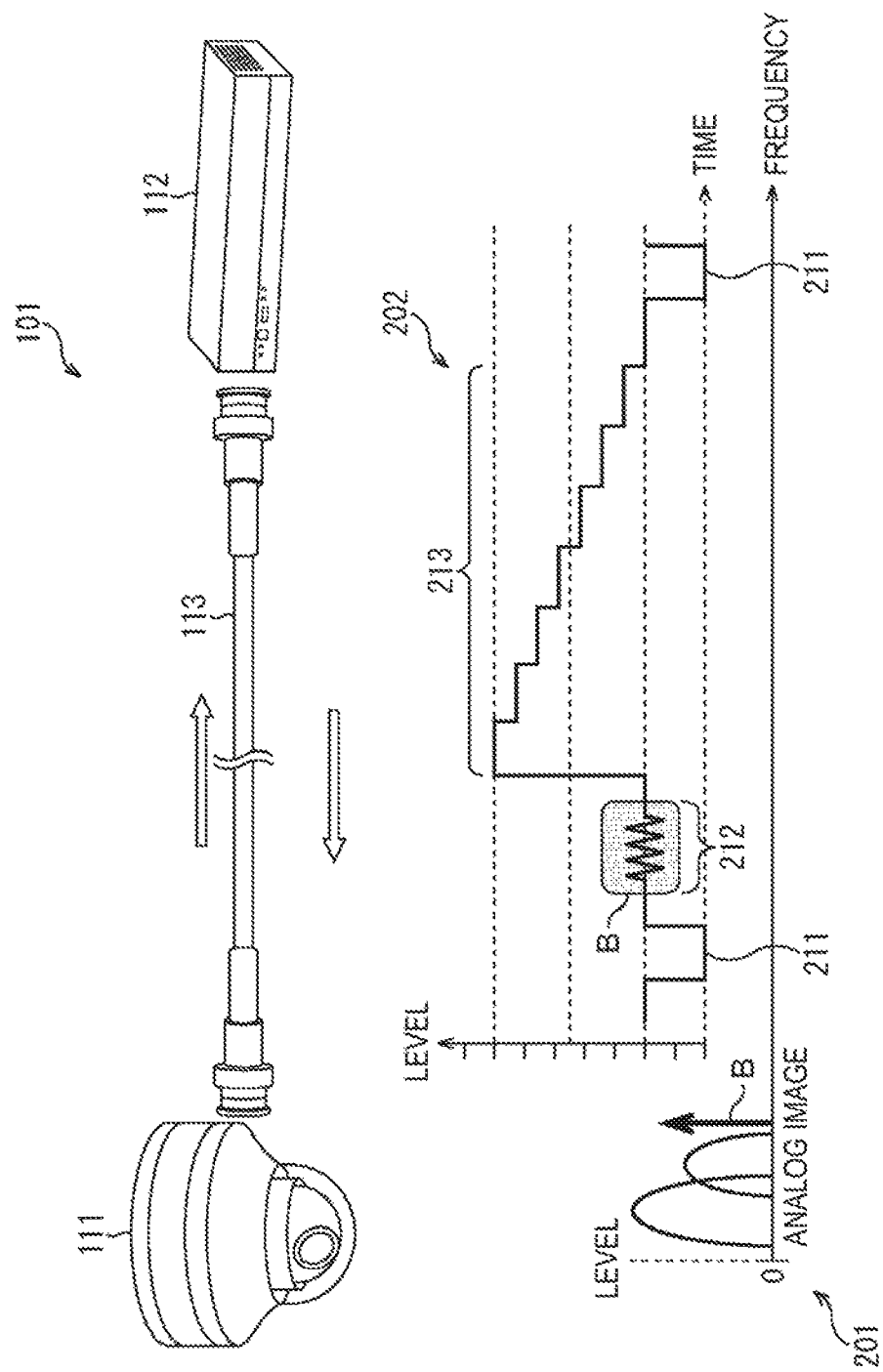
FIG. 4 is a diagram illustrating a second method of superimposing a control signal.
Figure 5:
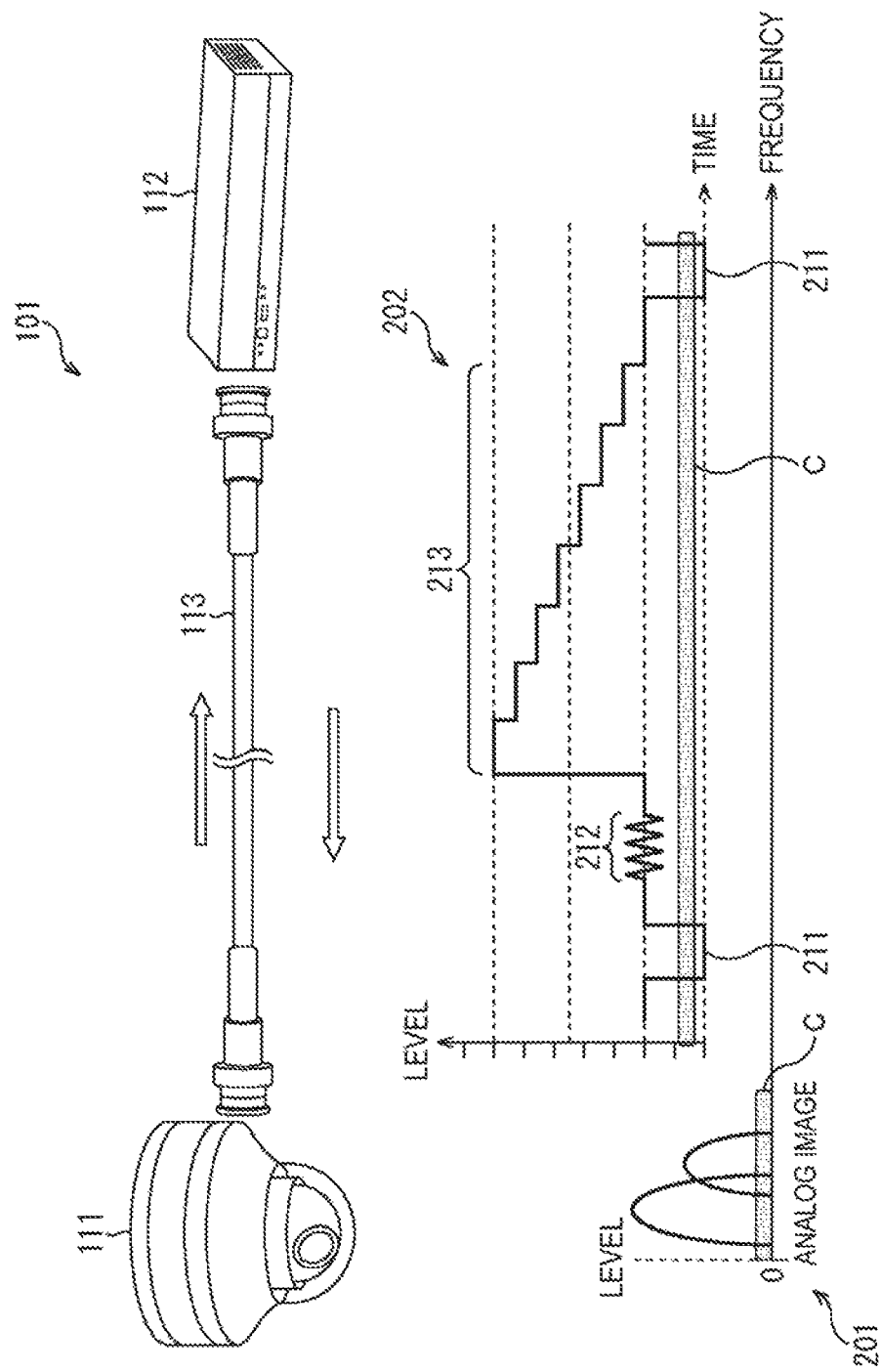
FIG. 5 is a diagram illustrating a third method of superimposing a control signal.

In examples of FIGS. 3 to 5, the monitoring camera system 101 including the imaging device 111, the recording reproduction device 112, and the coaxial cable 113 is illustrated. A spectrum 201 of an analog image on a frequency axis and temporal transition 202 of a video signal (CVBS signal) are illustrated below the monitoring camera system 101.

In the spectrum 201 of the analog image, the vertical axis represents a level of a signal and the horizontal axis represents a frequency. In the spectrum 201 of the analog image, a left-side circle represents a spectrum of a luminance signal and a right-side circle represents a spectrum of a color difference signal centering on 3.58 MHz.

In the temporal transition 202 of the video signal, the vertical axis represents a level and the horizontal axis represents temporal transition from the left end to the right end of a scanning line (a scanning line corresponding to one time) of the video signal. In the temporal transition 202 of the video signal, a horizontal synchronization signal section 211, a color burst section 212, and an active pixel region 213 are illustrated.

In the horizontal synchronization signal section 211, only a DC voltage is output. In the color burst section 212, a sinusoidal wave of 3.58 MHz is superimposed as a reference (signal) of the color difference signal in a case of an NTSC system. In the active pixel region 213, a luminance signal of a scanning line corresponding to one time and the color difference signal are superimposed.

In the examples of FIGS. 3 to 5, the active pixel region 213 is shown in a step-like shape to facilitate the description, but shows a state in which only the luminance signal is superimposed. In practice, since the color difference signal converted in a form called a phase difference and an amplitude difference from a reference (color burst) signal of a 3.58 MHz component is superimposed on the luminance signal, the active pixel region 213 shows a state in which minute waves are superimposed, as in the color burst section 212.

First, the first superimposition method of superimposing the PTZ signal will be described with reference to FIG. 3. In the first superimposition method, a PTZ signal A is superimposed in the horizontal synchronization signal section 211 in the temporal transition 202 of the video signal.

The PTZ signal A is superimposed on the spectrum of the color difference signal centering on 3.58 MHz on the frequency axis, as shown in the spectrum 201 of the analog image on the frequency axis. However, since the PTZ signal A is superimposed in the horizontal synchronization signal section 211, the PTZ signal A does not affect the video signal. Thus, the video signal and the PTZ signal can simultaneously be transmitted by one coaxial cable 113.

Next, the second superimposition method of superimposing the PTZ signal will be described with reference to FIG. 4. In the second superimposition method, a PTZ signal B is superimposed on the color burst section 212 in the temporal transition 202 of the video signal.

The PTZ signal B is superimposed on a signal equal to or less than 3 MHz by avoiding 3.58 MHz or a signal of 5 MHz or 6 MHz on the frequency axis, as shown in the spectrum 201 of the analog image on the frequency axis. Thus, the video signal and the PTZ signal can simultaneously be transmitted by one coaxial cable 113.

The third superimposition method of superimposing the PTZ signal will be described with reference to FIG. 5. In the third superimposition method, a PTZ signal C is superimposed on the entire video signal and is transmitted, as shown in the temporal transition 202 of the video signal.

However, the PTZ signal C is subjected to, for example, a spectrum diffusion process, so that the level of the PTZ signal C is lower than the noise level of the video signal. For example, a control signal delayed by about 1 KHz is diffused up to about 10 MHz.

Therefore, the level of the PTZ signal C is very weak compared to the video signal, and thus does not affect the video signal, as shown in the spectrum 201 of the analog image and the temporal transition 202 of the video signal. Thus, the video signal and the PTZ signal can simultaneously be transmitted by one coaxial cable 113.

[Process of Imaging Device]

Next, a process of the imaging device 111 will be described with reference to the flowchart of FIG. 6.

An image of light condensed via the lens 131 is formed in the imaging element 132 and is input as an analog video signal to the camera DSP 133. The camera DSP 133 performs predetermined signal processing on the analog video signal and outputs the analog video signal to the arithmetic unit 122.

In step S111, the arithmetic unit 122 transmits an analog video signal from the camera DSP 133 to the recording reproduction device 112 via the coaxial cable 113.

Figure 7:
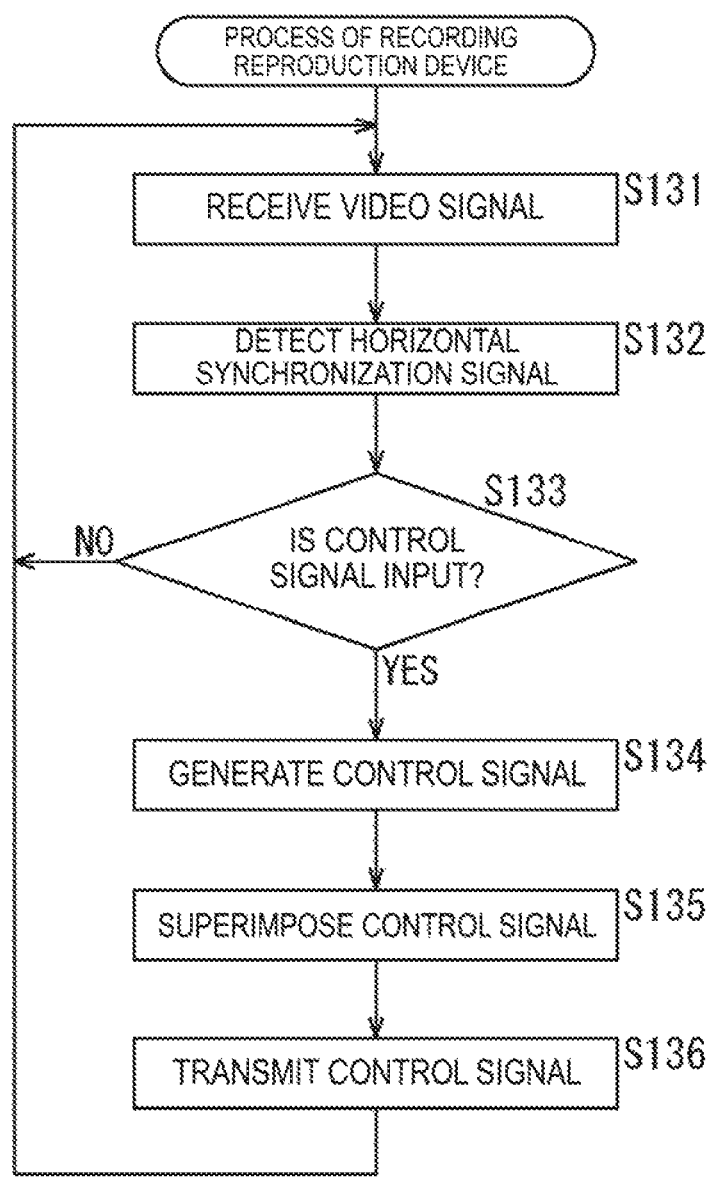
FIG. 7 is a flowchart illustrating a process of a reproduction recording device.

The recording reproduction device 112 receives the transmitted video signal and superimposes the control signal (PTZ signal) according to one of the first to third superimposition methods on the received video signal, and transmits the superimposed signal according to step S136 of FIG. 7 to be described below.

The arithmetic unit 122 supplies the signal received via the coaxial cable 113 to the control signal separation circuit 123. The control signal separation circuit 123 separates the control signal from the signal from the arithmetic unit 122 in correspondence with one of the first to third superimposition methods and supplies the separated control signal to the control unit 124.

That is, in the case of the first superimposition method, the control signal (the PTZ signal A in FIG. 3) is superimposed and transmitted in the horizontal synchronization signal section 211. In the case of the second superimposition method, the control signal (the PTZ signal B in FIG. 4) is superimposed on the color burst section 212 and is transmitted. In the case of the third superimposition method, the control signal (the PTZ signal C in FIG. 5) is subjected to the spectrum diffusion process to be superimposed on the entire video signal and is transmitted. In any case, the control signal can be separated simply.

In step S112, the control unit 124 determines whether the control signal is separated from the received signal. When it is determined in step S112 that the control signal is separated, the pan, tilt, or zoom process performed by the driving unit 125 is controlled based on the separated control signal in step S113.

In response to the control, the driving unit 125 drives (operates) the pan mechanism, the tilt mechanism, the zoom mechanism, or the like of the lens 131 in step S114. Thereafter, the process returns to step S111.

[Process of Recording Reproduction Device]

Next, a process of the recording reproduction device 112 will be described with reference to the flowchart of FIG. 7.

Figure 6:
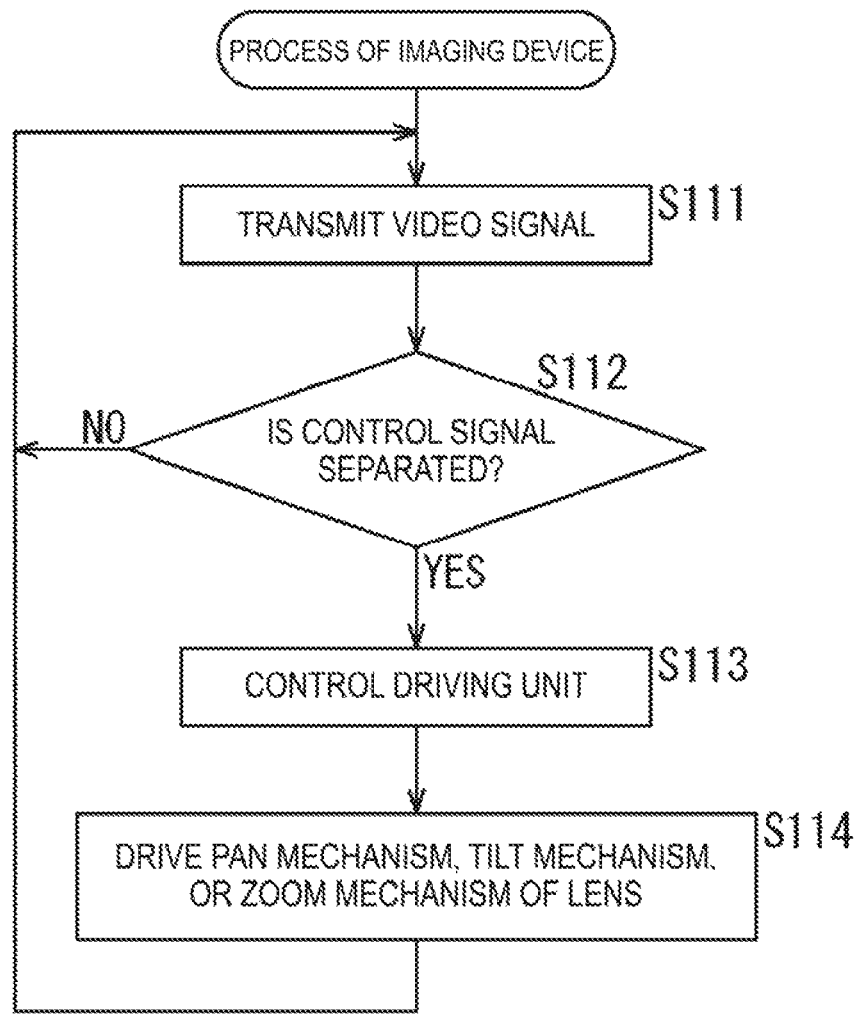
FIG. 6 is a flowchart illustrating a process of an imaging device.

The analog video signal from the camera DSP 133 in step S111 of FIG. 6 described above is transmitted to the recording reproduction device 112 via the coaxial cable 113.

Accordingly, in step S131, the arithmetic unit 141 receives the video signal from the imaging device 111 and supplies the video signal to the amplifier 151 of the video reproduction unit 142. The amplifier 151 amplifies the video signal from the arithmetic unit 141 and supplies the amplified video signal to the recording DSP 152.

The recording DSP 152 performs predetermined signal processing necessary for recording on the video signal amplified by the amplifier 151 and records the video signal on the storage 143. In step S132, the recording DSP 152 detects the horizontal synchronization signal from the amplified video signal and supplies the detected horizontal synchronization signal to the control unit 144.

On the other hand, the user gives an instruction of pan, tilt, zoom, and the like of the imaging device 111 using the control stick 146. The control stick 146 inputs a control signal in response to the user's operation and supplies the control signal to the control unit 144.

In step S133, the control unit 144 determines whether the control signal is input. When the control unit 144 determines that the control signal is input, the control unit 144 generates the control signal according to a superimposition method in step S134 and supplies the generated control signal to the control signal superimposition circuit 145.

At this time, in the case of the second superimposition method, the control unit 144 generates the control signal at a frequency other than the reference signal of the color difference signal. In the case of the third superimposition method, the control unit 144 performs, for example, a spectrum diffusion process on the control signal such that the level of the control signal is lower than the noise level of the video signal and supplies the video signal obtained after the spectrum diffusion process to the control signal superimposition circuit 145.

In step S135, the control unit 144 controls the control signal superimposition circuit 145 such that the control signal superimposition circuit 145 superimposes the control signal on the video signal. That is, the control signal superimposition circuit 145 superimposes the control signal on the video signal by outputting the control signal to the arithmetic unit 141 according to the superimposition method determined by the control unit 144.

In the case of the first superimposition method, the control signal superimposition circuit 145 superimposes the control signal on the horizontal synchronization signal detected by the recording DSP 152, as illustrated in FIG. 3.

In the case of the second superimposition method, the control signal superimposition circuit 145 superimposes the control signal on the color burst section continued after the horizontal synchronization signal detected by the recording DSP 152, as illustrated in FIG. 4.

In the case of the third superimposition method, the control signal superimposition circuit 145 superimposes the control signal on the entire video signal, as illustrated in FIG. 5.

In step S136, the arithmetic unit 141 superimposes the control signal from the control signal superimposition circuit 145 on the video signal and transmits the control signal to the imaging device 111. Thereafter, the process returns to step S131 and the subsequent processes are repeated.

Thus, since the control signal is superimposed without the influence on the video signal, the two signals, the video signal and the control signal, can be transmitted and received via one coaxial cable.

Accordingly, when the PTZ function is added to the previously installed monitoring camera, it is possible to suppress occurrence of installation cost of a new cable.

In the above description, the coaxial cable 113 has been used as a cable used to transmit the video signal and the control signal between the monitoring camera 111 and the recording reproduction device 112. However, the embodiment of the present technology is not limited to the coaxial cable, as long as the cable having the same function is used.

In the above description, the PTZ signal used to perform the PTZ (pan, tilt, and zoom) control has been described as an example of the control signal. However, the embodiment of the present technology is applicable also to a control signal used to perform control other than the control of the pan, the tilt, and the zoom.

The above-described series of processes can be performed by hardware and software. When the series of processes are performed by software, a program of the software is installed in a computer. Here, examples of the computer include a computer embedded in dedicated hardware and a general-purpose personal computer capable of various functions by installing various programs.

[Example of Configuration of Computer]

Figure 8:
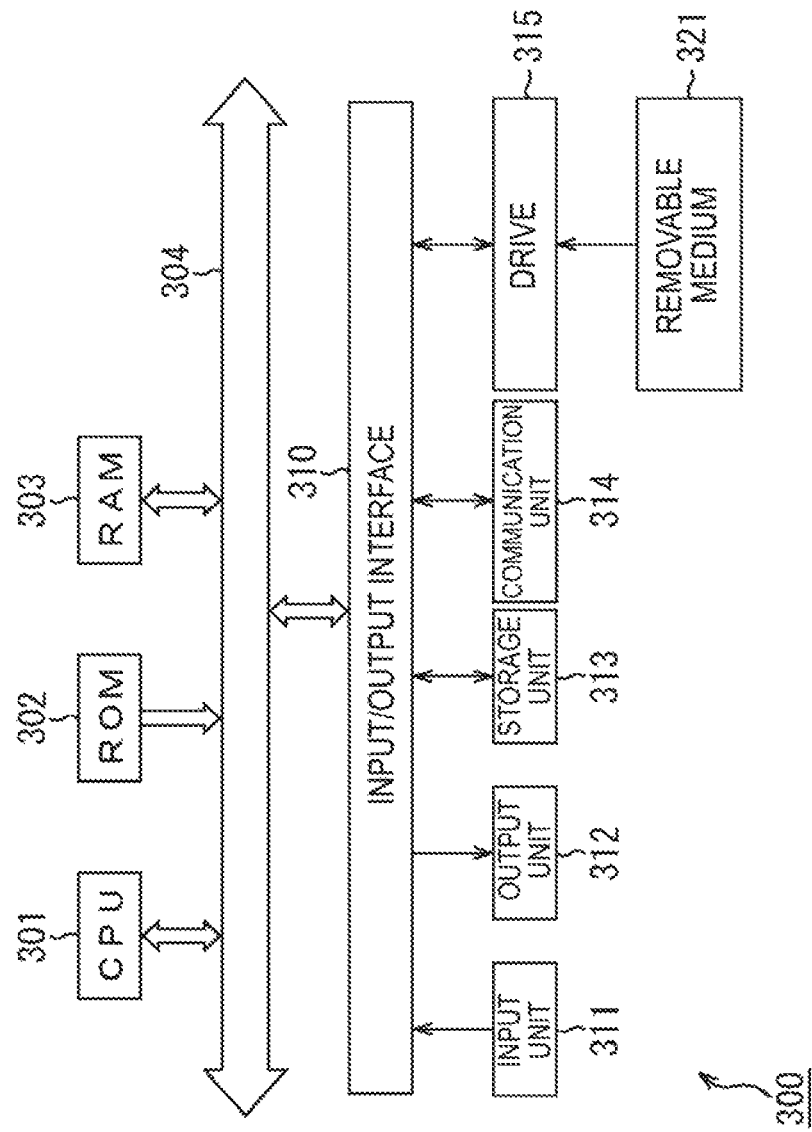
FIG. 8 is a block diagram illustrating an example of the configuration of a computer.

FIG. 8 is a diagram illustrating an example of a hardware configuration of a computer that performs the above-described series of processes according to a program.

In a computer 300, a central processing unit (CPU) 301, a read-only memory (ROM) 302, and a random access memory (RAM) 303 are connected to each other via a bus 304.

An input/output interface 305 is connected to the bus 304. An input unit 306, an output unit 307, a storage unit 308, a communication unit 309, and a drive 310 are connected to the input/output interface 305.

The input unit 306 includes a keyboard, a mouse, or a microphone. The output unit 307 includes a display or a speaker. The storage unit 308 includes a hard disk or a non-volatile memory. The communication unit 309 includes a network interface. The drive 310 drives a removable medium 311 such as a magnetic disk, an optical disc, a magneto-optical disc, or a semiconductor memory.

In the computer having the above-described configuration, the CPU 301 performs the above-described series of processes by loading the program stored in the storage unit 308 in the RAM 303 via the input/output interface 305 and the bus 304 and executing the program.

For example, the program executed by the computer (CPU 301) can be recorded on the removable medium 311 serving as a package medium or the like and supplied. Further, the program can be supplied via a wired or wireless transmission medium such as a local area network, the Internet, or a digital satellite broadcast.

In the computer, the program can be installed in the storage unit 308 via the input/output interface 305 by mounting the removable medium 311 on the drive 310. Further, the program can be received via a wired or wireless transmission medium by the communication unit 309 and can be installed in the storage unit 308. Furthermore, the program can be installed in advance in the ROM 302 or the storage unit 308.

The program executed by the computer may be a program processed chronologically in a sequence described in the specification or may be a program processed in parallel or at a necessary timing or the like at which the program is called.

In the specification, while the steps describing the above-described series of processes obviously include processes performed chronologically in a described sequence, the processes is not necessarily performed chronologically but may also be performed in parallel or individually.

An embodiment of the present technology is not limited to the above-described embodiment, but may be modified in various ways within the scope of the present technology without departing from the gist of the present technology.

The respective steps described in the above-described flowcharts can be performed by one device or may be also distributed and performed by a plurality of devices.

When a plurality of processes are included in one step, the plurality of processes included in the one step may be executed by one device and may also be distributed and performed by a plurality of devices.

The configuration described above as one device (or a processing unit) may be divided and formed as a plurality of devices (or processing units). On the other hand, the configurations described above as the plurality of devices (or processing units) may be collected and formed as one device (or processing unit). A configuration other than the above-described configuration may, of course, be added to the configuration of each device (or each processing unit). When the configurations or processes of the entire system are substantially the same, a part of the configuration of a given device (or processing unit) may be included in the configuration of another device (or another processing unit). That is, an embodiment of the present technology is not limited to the above-described embodiment, but may be modified in various ways within the scope of the gist of the present technology.

The preferred embodiment of the present technology has been described above in detail with reference to the appended drawings, but an embodiment of the present technology is not limited to the embodiment. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A signal processing device including:
a signal generation unit that generates a control signal for controlling an imaging device connected via one cable;
a signal superimposition unit that superimposes the control signal generated by the signal generation unit on a video signal received from the imaging device via the cable without an influence on display of a video corresponding to the video signal; and
a transmission unit that transmits the signals superimposed by the signal superimposition unit to the imaging device via the cable.

(2) The signal processing device according to (1), wherein the signal generation unit generates a control signal for controlling at least one of pan, tilt, and zoom of the imaging device.

(3) The signal processing device according to (2), wherein the signal superimposition unit superimposes the control signal in a horizontal synchronization signal section of the video signal.

(4) The signal processing device according to (2),
wherein the signal generation unit generates the control signal at a frequency other than a reference frequency of a color difference signal, and
wherein the signal superimposition unit superimposes the control signal generated by the signal generation unit on a color burst section of the video signal.

(5) The signal processing device according to (2),
wherein the signal generation unit generates the control signal at a level lower than a noise level of the video signal, and
wherein the signal superimposition unit superimposes the control signal generated by the signal generation unit on the entire video signal.

(6) The signal processing device according to any one of (1) to (5), further including:
a recording control unit that controls recording of the video signal.

(7) The signal processing device according to any one of (1) to (5), further including:
a display control unit that controls display of the video signal.

(8) A signal processing method performed by a signal processing device, the method including:
generating a control signal for controlling an imaging device connected via one cable;
superimposing the generated control signal on a video signal received from the imaging device via the cable without an influence on display of a video corresponding to the video signal; and
transmitting the superimposed signals to the imaging device via the cable.

What is claimed is:
1. A signal processing device, comprising:
circuitry configured to:
provide a control signal to control an imaging device connected with the signal processing device via a cable,
wherein the control signal is provided at a frequency different from a reference frequency of a video signal; and transmit the control signal to the imaging device via the cable in a time when a signal in an active pixel region is not transmitted, wherein the control signal is adjusted on at least one of a transmission frequency or a signal level of the control signal, and wherein the control signal is provided at a frequency different from a reference frequency of a color difference signal of the video signal.

2. The signal processing device according to claim 1, wherein the circuitry is further configured to provide the control signal to control one of pan, tilt, or zoom of the imaging device.

3. The signal processing device according to claim 2, wherein the circuitry is further configured to combine the control signal with a color burst section of the video signal.

4. The signal processing device according to claim 2, wherein the circuitry is further configured to:

provide the control signal at a level lower than a noise of the video signal, and combine the control signal with the video signal.

5. The signal processing device according to claim 1, wherein the circuitry is further configured to combine the control signal with a horizontal synchronization signal section of the video signal.

6. The signal processing device according to claim 1, wherein the circuitry is further configured to combine the control signal with a color burst section of the video signal.

7. The signal processing device according to claim 1, wherein the circuitry is further configured to:

provide the control signal at a level lower than a noise of the video signal, and combine the control signal with the video signal.

8. A signal processing method, comprising:

in a signal processing device:

providing a control signal to control an imaging device connected with the signal processing device via a cable, wherein the control signal is provided at a frequency different from a reference frequency of a video signal; and transmitting the control signal to the imaging device via the cable in a time when a signal in an active pixel region is not transmitted, wherein the control signal is adjusted on at least one of a transmission frequency or a signal level of the control signal, and wherein the control signal is provided at a frequency different from a reference frequency of a color difference signal of the video signal.

9. A signal processing device, comprising:

a control signal generating section configured to provide a control signal to control an imaging device connected with the signal processing device via a cable, wherein the control signal is provided at a frequency different from a reference frequency of a video signal; and a transmitting section configured to transmit the control signal to the imaging device via the cable in a time when a signal in an active pixel region is not transmitted, wherein the control signal is adjusted on at least one of a transmission frequency or a signal level of the control signal, and wherein the control signal generating section is further configured to provide the control signal at a frequency different from a reference frequency of a color difference signal of the video signal.

* * * * *